US005820118A

United States Patent [19]

Craft

[11] Patent Number: 5,820,118

[45] Date of Patent: Oct. 13, 1998

[54] SWING CLAMP APPARATUS

[75] Inventor: Roger L. Craft, Emporia, Kans.

[73] Assignee: Vektek, Inc., Emporia, Kans.

[21] Appl. No.: 788,542

[22] Filed: Jan. 24, 1997

[51] Int. Cl.[6] .......... B23Q 3/08

[52] U.S. Cl. .......... 269/24; 269/25; 269/27; 269/30

[58] Field of Search .......... 269/24, 25, 32, 269/31, 27, 20, 66, 138, 196, 229

[56] References Cited

U.S. PATENT DOCUMENTS

| | | | |
|---|---|---|---|
| 3,572,216 | 3/1971 | Sesody | 269/32 |
| 3,605,569 | 9/1971 | Sessody | 269/32 |
| 3,948,502 | 4/1976 | Waller et al. | 269/27 |
| 4,351,516 | 9/1982 | Ersoy et al. | 269/32 |
| 4,508,327 | 4/1985 | Ersoy | 269/27 |
| 5,013,015 | 5/1991 | Fatheree | 269/27 |
| 5,437,440 | 8/1995 | Keaton | 269/32 |
| 5,695,177 | 12/1997 | Mascola | 269/24 |

*Primary Examiner*—James G. Smith
*Assistant Examiner*—Lee Wilson
*Attorney, Agent, or Firm*—Hovey,Williams, Timmons & Collins

[57] ABSTRACT

A hydraulically-operated swing clamp (10) for holding and clamping a workpiece (14) to a fixture (12) is disclosed. The swing clamp (10) includes an improved cam assembly (24) that swings its clamping head (22) away from the workpiece (14) when the piston (22) of the clamp (10) is shifted to its extended, unclamped position. The cam assembly (24) includes at least one cam track or groove (38,40,42) and a corresponding cam follower ball (44) received within the groove (38,40,42). The cam track (38,40,42) includes a central arcuate region (48) and a pair of substantially planar side faces (50,52) extending tangentially from the central arcuate region (48). The central arcuate region (48) has a radius of curvature substantially equal to the radius of curvature of the cam follower ball (44). The planar side faces (50,52) extend tangentially away from the central arcuate region (48) and the cam follower ball (44).

10 Claims, 1 Drawing Sheet

90° ±1°

SWING CLAMP APPARATUS

BACKGROUND OF THE INVENTION

1. Field of the Invention

The present invention relates to hydraulically-operated clamps for holding and clamping workpieces to fixtures. More particularly, the invention relates to a swing clamp having a swinging mechanism that swings the clamp's clamping head away from the workpiece when the clamp is shifted to its extended, unclamped position.

2. Description of the Prior Art

Hydraulic clamps are commonly used in manufacturing operations to hold and clamp workpieces to stationary fixtures so that the workpieces may be machined or otherwise worked upon. Known hydraulic clamps typically include a cylinder body adapted for attachment to a fixture, a piston telescopically received within the cylinder body for movement between a retracted, clamped position and an extended, released position when hydraulic fluid is supplied to the cylinder body, and a clamping head attached to the distal end of the piston for holding and clamping the workpiece to the fixture when the piston is shifted to its clamped position. Typically, several such clamps are mounted to a single fixture so that a workpiece can be securely held from several sides while it is worked upon.

Swing clamps are hydraulic clamps that include swinging mechanisms that swing their clamping heads away from the workpiece when their pistons are extended to their unclamped positions. Swing clamps make it easier to load and unload workpieces from fixtures, especially in confined spaces.

One type of swinging mechanism used in swing clamps is a cam assembly including a curved cam track or groove formed in either the piston or the cylinder body and a corresponding cam follower ball attached to the other of the piston or the cylinder body. The cam follower ball moves along the curved cam groove when the piston is shifted to its extended, unclamped position, and therefore rotates the piston relative to the cylinder body and swings the clamping head away from the workpiece.

Although conventional cam assemblies effectively swing their clamping heads when the clamps are first manufactured, they are subject to premature wear over time that interferes with the swinging operation of the clamps. Specifically, when the cam follower ball moves in the cam groove, it is subject to circumferential forces which tend to push the ball to the sides of the cam groove. Over time, its cam ball wears down the edges of its cam groove and creates dimples along the length of the cam groove. The dimples and worn regions of the cam groove often catch the cam ball as it moves along the cam groove, causing the swinging movement of the clamping head to become choppy. When a clamp is used in severe operating conditions, its cam ball may completely wear down the edges of its cam groove, causing the cam ball to completely roll out of the groove.

Excessive wear on the cam groove of a clamp can be a serious problem. In many clamping operations, it is important for the clamping head to swing to a precise location away from the workpiece when the piston is shifted to its unclamped position and to then return exactly to its starting position when the piston is shifted to its clamped position. When the cam groove on a clamp becomes worn, the swing clamp can no longer achieve this precise and repeatable swinging movement. Thus, the entire swing clamp often must be replaced, even though the remaining parts of the clamp are in good condition.

OBJECTS AND SUMMARY OF THE INVENTION

In view of the above-described limitations of prior art hydraulic swing clamps, it is an object of the present invention to provide a swing clamp having an improved swinging mechanism.

It is a more specific object of the present invention to provide a swing clamp with a swinging mechanism that is less subject to premature wear caused by contact between the cam groove and cam follower ball.

The present invention achieves these objects and other objects that become evident from the description of the preferred embodiments of the invention herein by providing a hydraulic swing clamp having a cylinder body, a piston, a clamping head, and an improved swinging mechanism. The preferred swinging mechanism is a cam assembly including a cam track or groove formed in either the piston or the cylinder body and a corresponding cam follower ball attached to the other of the piston or the cylinder body.

The cam groove is formed in such a way to prevent the cam follower ball from prematurely wearing down the edges of the cam groove and from rolling over the edges of the cam groove. To this end, the cam track includes a central arcuate region and a pair of substantially planar side faces extending tangentially from the central arcuate region. The central arcuate region has a radius of curvature substantially equal to the radius of curvature of the cam follower ball. However, the planar side faces extend tangentially away from the central arcuate region and the cam follower ball.

This construction forces the cam follower ball to be seated in the central arcuate region of the cam groove without pushing up against the edges of the cam groove, thus eliminating edge rollover and significantly reducing the wear on the cam groove. Applicant has discovered that this construction extends the life of a swing clamp subject to severe operating conditions by approximately 300%.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figures 1, 2, 3, 4, 5, 6, 7:
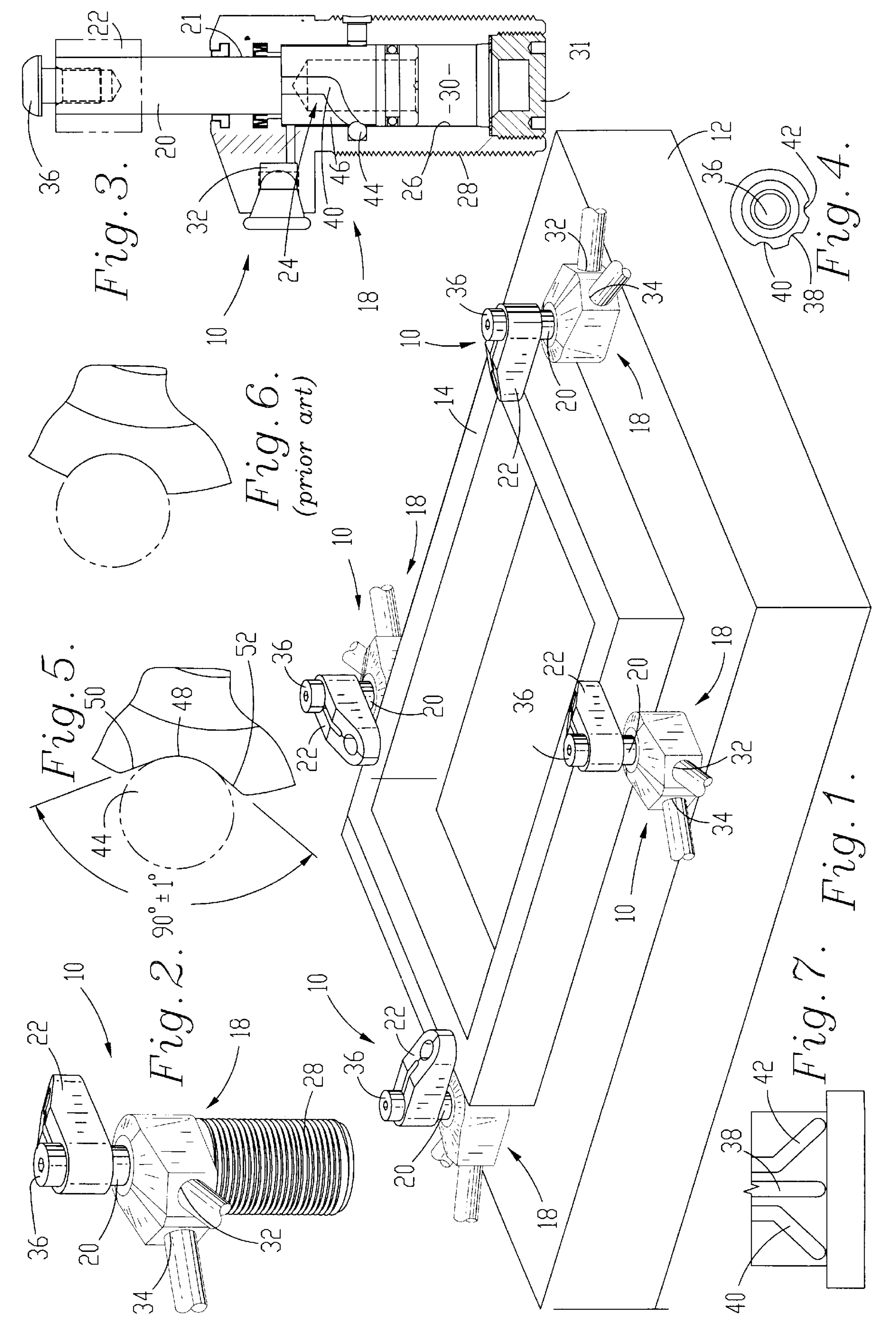
Fig. 6. (prior art)
FIG. 1 is a perspective view of a plurality of hydraulic swing clamps constructed in accordance with a preferred embodiment of the present invention shown clamping a workpiece to a fixture.
FIG. 2 is a perspective view of one of the swing clamps shown removed from the fixture.
FIG. 3 is a side section view of the swing clamp illustrating the internal components of the clamp in more detail.
FIG. 4 is a top section view of the piston of the swing clamp.
FIG. 5 is a fragmented, top section view of one of the cam grooves of the swing clamp showing the cam follower ball in phantom lines.
FIG. 6 is a fragmented, top section view of a cam groove of a prior art hydraulic swing clamp showing its cam follower ball in phantom lines.
FIG. 7 is a fragmented, side section view of the swing clamp showing the spacing and direction of several cam grooves.

Turning now to the drawing figures, and particularly FIG. 1, a plurality of hydraulic swing clamps 10 constructed in accordance with a preferred embodiment of the invention are shown attached to a fixture 12 for holding or clamping a workpiece 14 thereon. The fixture 12 may be any generally planar support surface and preferably has a plurality of bore holes or slots formed in its upper surface. The bore holes are threaded for receiving the clamps 10 as described below. The fixture 12 may be attached to a larger stationary base support or may be unattached so that it can be easily transported in a machining and manufacturing plant.

The clamps 10 are substantially identical to one another and may be either double-acting (as illustrated) or single-acting. As best illustrated in FIG. 3, each clamp broadly includes a hollow cylinder body 18, a piston 20 telescopically received within the cylinder body, a clamping head 22 attached to the upper end of the piston, and swinging mechanism generally referred to by the numeral 24 for swinging the clamping head 22 relative to the cylinder body.

In more detail, the hollow cylinder body 18 is formed of steel or other suitable material and has opposed inner and outer walls 26,28, respectively. The inner wall 26 defines an elongated, cylindrical piston-receiving chamber 30 within the confines of the cylinder body.

The lower portion of the outer wall 28 is threaded as best illustrated in FIG. 2 for permitting the swing clamp 10 to be screwed into one of the threaded bore holes formed in the fixture 12. The bottom end of the cylinder body 18 is provided with a removable retainer plug 31 which is threadably received therein.

As best illustrated in FIG. 2, the upper region of the cylinder body 18 includes a pair of hydraulic ports 32,34 formed therein that couple with conventional hydraulic tubing for supplying hydraulic fluid to and discharging hydraulic fluid from the piston-receiving chamber 30. The swing clamp 10 may also include a flow control valve (not shown) positioned in the tubing connected to the hydraulic ports 32,34 or in the cylinder body 18 itself for selectively varying the rate of hydraulic fluid flow supplied or discharged from the cylinder body for selectively controlling the shifting speed of the piston 20.

Those skilled in the art will appreciate that the illustrated double-acting clamp may be converted to a single-acting clamp by replacing one of the hydraulic ports 32, 34 with a spring or other biasing means (not shown).

Returning to FIG. 3, the piston 20 is generally cylindrical in shape and has an outer wall 21. The piston 20 is telescopically received within the piston-receiving chamber 30 of the cylinder body 18 and is moved relative to the cylinder body when hydraulic fluid is delivered to or discharged from the hydraulic ports 32,34. The piston 20 is moveable between a retracted, clamped position illustrated in FIG. 1 and an extended, released position illustrated in FIG. 3.

The clamping head 22, which engages and clamps the workpiece 14 to the fixture 12 when the piston 20 is shifted to its retracted, clamped position, is attached to the top of the piston 20 and extends laterally therefrom. The clamping head 22 is preferably secured to the top of the piston 20 by a removable threaded plug 36 or button, but may also be attached by other conventional fastening means.

The swinging mechanism 24 rotates the piston 20 relative to the cylinder body 18 when the piston is shifted between its clamped and released positions and therefore swings the clamping head 22 toward and away from the workpiece 14. Specifically, the swinging mechanism 24 swings the clamping head 22 approximately 90° either to the left or right when the piston 20 is shifted to its released position and then swings the clamping head 90° back to its starting position when the piston is shifted to its clamped position.

The preferred swinging mechanism 24 is a cam assembly including at least one cam track or groove 38,40,42 formed in the outer wall 21 of the piston 20 and a corresponding cam follower ball 44 attached to a recessed portion of the inner wall 26 of the cylinder body 18. The cam follower ball 44 is received within one of the cam grooves 38,40,42 for movement along the cam groove when the piston 20 is shifted between its clamped and released positions. As the cam follower ball 44 moves along the length of its corresponding cam grove 38,40,42, it rotates the piston 20 relative to the cylinder body 18 and therefore swings the clamping head 22 toward or away from the workpiece 14 positioned on the fixture 12.

Those skilled in the art will appreciate that the positions of the cam grooves 38,40,42 and cam follower ball 44 may be reversed, i.e., the cam grooves may be formed in the inner wall 26 of the cylinder body 18 and the cam follower ball may be attached to the outer wall 21 of the piston 20.

As best illustrated in FIGS. 4 and 7, the preferred cam assembly includes three, spaced-apart cam grooves 38,40, 42. The first cam groove 38 is straight so that the cam follower ball 44 does not rotate the piston 20 as it moves along the length of the cam grove 38. The second and third cam grooves 40,42 are formed in helical or otherwise curved patterns so that the cam follower ball 44 rotates the piston 20 as it moves along the length of the grooves 40,42. The cam grooves 40,42 extend in opposite directions so that the clamping head 22 may be swung either to the right or left during shifting of the piston 20.

The cam assembly is adjustable so that the cam follower ball 44 may be received within any one of the cam grooves 38,40,42. To move the cam follower ball 44 from one cam groove to another, the retainer plug 31 in the lower end of the cylinder body 18 is first removed. The piston 20 is then partially removed from the piston-receiving chamber 30 of the cylinder body 18 so that the cam follower ball 44 slides out the bottom portion of the cam groove in which it is currently positioned. The piston 20 is then rotated to align the cam follower ball 44 with another cam groove and then repositioned entirely in the piston-receiving chamber 30. Finally, the retainer plug 31 is rethreaded into the bottom end of the cylinder body 18.

In accordance with the present invention, each of the cam grooves 38,40,42 is formed in such a way to prevent the cam follower ball 44 from prematurely wearing down the edges of the cam grooves and from rolling over the edges of the cam grooves. Specifically, as best illustrated in FIG. 5, each cam grove 38,40,42 includes a central arcuate region 48 and a pair of substantially planar side faces 50,52 extending tangentially from the central arcuate region.

The central arcuate region 48 has a radius of curvature substantially equal to the radius of curvature of the cam follower ball 44. However, the side faces 50,52 are generally planar and extend tangentially away from the central arcuate region 48 and the periphery of the cam follower ball 44. As illustrated in FIG. 5, the planar side faces 50,52 preferably diverge from one another at an included angle of approximately 90°+/−1°.

This construction forces the cam follower ball 44 to be seated in the central arcuate regions 48 of the cam grooves without pushing up against the edges of the cam grooves. Thus, the contact forces between the cam follower ball 44 and its corresponding cam groove 38,40,42 are moved from the corners of the cam groove to the relatively stronger central arcuate region 48 of the groove. This prevents the cam follower ball 44 from rolling over the edges of the groove 38,40,42 and therefore significantly reduces the wear on the cam groove. Applicant has discovered that this construction extends the life of the cam grooves 38,40,42 by approximately 300% when the swing clamp 10 is subject to severe operating conditions.

In contrast, as illustrated in FIG. 6, the cam grooves on prior art swing clamps are entirely arcuate in shape and have no planar side faces. The entire surface of these prior art cam grooves has the same radius of curvature as their corresponding cam follower ball. Thus, the contact forces between the cam follower ball in these prior art swing clamps are concentrated on the corners of the cam grooves. As discussed in the Background section above, this prior art construction is subject to excessive cam groove wear and cam follower ball displacement.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A clamp for clamping a workpiece to a fixture, the clamp comprising:

an elongated hollow cylinder body for attachment to the fixture, the cylinder body having an interior wall;

a piston telescopically received within the cylinder body for movement between a retracted, clamped position and an extended, released position, the piston having an outer wall; and a cam assembly for rotating the piston relative to the cylinder body when the piston is moved between the retracted, clamped and extended, released positions, the cam assembly including a cam track formed in one of the interior wall of the cylinder body and the outer wall of the piston, and a cam follower attached to the other of the interior wall of the cylinder body and the outer wall of the piston and received within the cam track for movement along the cam track when the piston is moved between the clamped and released positions, the cam follower having an outer peripheral surface and a radius of curvature, the cam track including a central arcuate region having a radius of curvature substantially equal to the radius of curvature of the cam follower and a pair of opposed, substantially planar side faces extending from the central arcuate region, said side faces each having a proximal end that converges into said central arcuate region and an opposite distal end that diverges away from the central arcuate region, the distal ends diverging away from one another.

2. The clamp as set forth in claim 1, wherein the cam track is a groove formed in the outer wall of the piston.

3. The clamp as set forth in claim 1, wherein the cam follower is a ball attached to the inner wall of the cylinder body.

4. The clamp as set forth in claim 1, the cam assembly including a plurality of spaced-apart cam tracks extending in different directions along the outer wall of the piston, the cam follower being positionable in any one of the cam tracks for rotating the piston relative to the cylinder body in any one of the different directions.

5. The clamp as set forth in claim 1, further including a clamping head fixed to the piston for engaging and clamping the workpiece to the fixture when the piston is moved to its retracted, clamped position.

6. A clamping assembly for clamping a workpiece, the clamping assembly comprising:

a fixture for supporting the workpiece thereon; and a plurality of clamps for clamping the workpiece to the fixture, each of the clamps including elongated hollow cylinder body for attachment to the fixture, the cylinder body having an interior wall, a piston telescopically received within the cylinder body for movement between a retracted, clamped position and an extended, released position, the piston having an outer wall, and a cam assembly for rotating the piston relative to the cylinder body when the piston is moved between the clamped and released positions, the cam assembly including cam track formed in one of the interior wall of the cylinder body and the outer wall of the piston, and a cam follower attached to the other of the interior wall of the cylinder body and the outer wall of the piston and received within the cam track for movement along the cam track when the piston is moved between the clamped and released positions, the cam follower having an outer peripheral surface and a radius of curvature, the cam track including a central arcuate region having a radius of curvature substantially equal to the radius of curvature of the cam follower and a pair of opposed, substantially planar side faces extending from the central arcuate region, said side faces each having a proximal end that converges into said central arcuate region and an opposite distal end that diverges away from the central arcuate region, the distal ends diverging away from one another.

7. The clamping assembly as set forth in claim 6, wherein the cam track is a groove formed in the outer wall of the piston.

8. The clamping assembly as set forth in claim 6, wherein the cam follower is a ball attached to the inner wall of the cylinder body.

9. The clamping assembly as set forth in claim 6, the cam assembly including a plurality of spaced-apart cam tracks extending in different directions along the outer wall of the piston, the cam follower being positionable in any one of the cam tracks for rotating the piston relative to the cylinder body in any one of the different directions.

10. The clamping assembly as set forth in claim 6, further including a clamping head fixed to the piston for engaging and clamping the workpiece to the fixture when the piston is moved to its retracted, clamped position.

* * * * *